United States Patent
Kleemeier et al.

[11] Patent Number: 6,038,115
[45] Date of Patent: Mar. 14, 2000

[54] SOCKET-OUTLET

[75] Inventors: Manfred Kleemeier, Neutraubling; Reinhard Schmid, Regensburg; Reinhard Solleder, Lappersdorf, all of Germany

[73] Assignee: Siemens Aktiengesellschaft, Munich, Germany

[21] Appl. No.: 09/117,009

[22] PCT Filed: Jan. 8, 1997

[86] PCT No.: PCT/DE97/00016

§ 371 Date: Dec. 11, 1998

§ 102(e) Date: Dec. 11, 1998

[87] PCT Pub. No.: WO97/26687

PCT Pub. Date: Jul. 24, 1997

[30] Foreign Application Priority Data

Jan. 19, 1996 [DE] Germany ............................ 196 01 883

[51] Int. Cl.[7] ...................................................... H02H 3/00
[52] U.S. Cl. ............................ 361/42; 361/56; 361/93.1; 361/115
[58] Field of Search ................................ 361/42, 18, 56, 361/58, 115, 93

[56] References Cited

U.S. PATENT DOCUMENTS 4,316,187  2/1982  Spencer ..................................... 340/664
5,029,037  7/1991  Bartelink ..................................... 361/42

FOREIGN PATENT DOCUMENTS

| 0 305 856 | 3/1989 | European Pat. Off. ......... H02H 3/16 |
| 2 609 578 | 7/1988 | France ........................... H01R 13/44 |
| 35 08 204 | 9/1986 | Germany ........................ H02J 13/00 |
| 36 38 737 | 7/1987 | Germany ........................ H02J 13/00 |
| 37 04 021 | 8/1988 | Germany ........................ G01R 27/08 |
| 38 36 275 | 4/1990 | Germany ......................... H02H 5/12 |
| 39 09 064 | 9/1990 | Germany ........................ H02J 13/00 |
| 41 39 647 | 6/1993 | Germany ........................ H02J 13/00 |
| 42 05 517 | 8/1993 | Germany ........................ H02J 13/00 |
| 93 12 528 | 11/1993 | Germany ....................... H01R 13/00 |
| 44 00 657 | 3/1995 | Germany ........................ H02J 13/00 |
| WO 89/11747 | 11/1989 | WIPO . |

*Primary Examiner*—Stephen W. Jackson
*Attorney, Agent, or Firm*—Kenyon & Kenyon

[57] ABSTRACT

A socket-outlet, in which, only in response to preselected loads, voltage from the supply-side is connected through by a switching device to the load side. A voltage-supplied measuring device has a D.C. testing circuit and an A.C. testing circuit. Both testing circuits attempt to drive measuring currents across a connected load. The A.C. testing circuit operates at higher frequencies than the power-line frequency. An evaluation circuit is designed, on the basis of preselected criteria and on the basis of measuring values, in logical AND-connection, to determine whether switching contacts of the switching device should be closed.

3 Claims, 1 Drawing Sheet

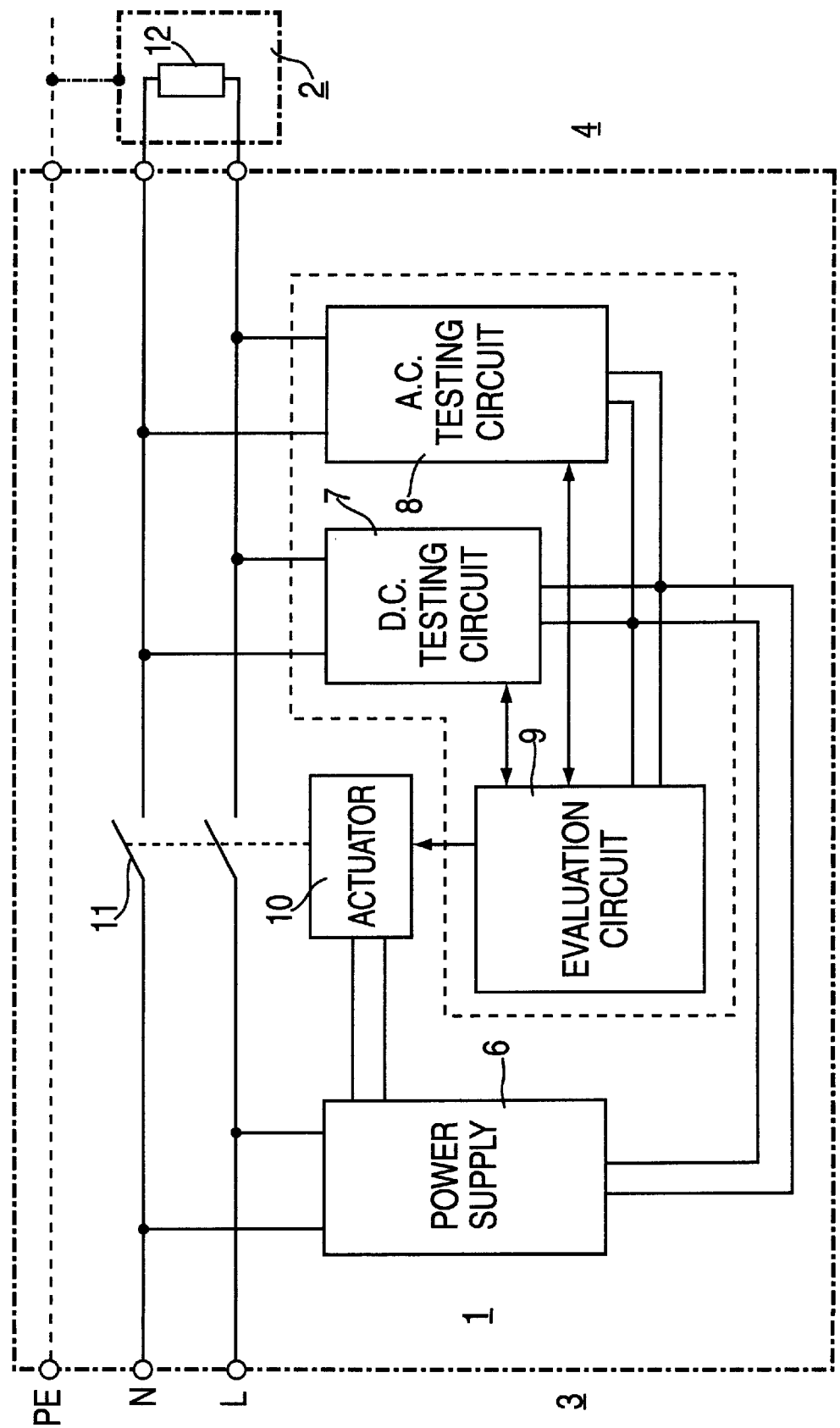

SOCKET-OUTLET

FIELD OF THE INVENTION

The present invention relates to a socket-outlet, in which voltage is connected by a switching circuit, from a supply side to a load side only in response to a designated load. Thus, voltage will be provided at the socket-outlets only when an electrical load is connected. German Patent Application No. U 9 312 528 describes a bus system which directs a switching command to a socket-outlet. In this way, the socket-outlet is usually off-circuit (i.e., without power), and thus that in-circuit (i.e., with power) parts cannot be reached by small children, in inadvertent contact, or by adults, during wallpapering or resulting from an unscrewed cover. A voltage-supplied measuring device includes a D.C. testing circuit which is designed to drive a current across a connectable load for measuring purposes. The D.C. testing circuit is designed to measure the impedance of a connected load using a test voltage that is low with respect to a dangerous voltage. In addition, the device includes an A.C. testing circuit which is designed to measure the impedance of a connected load using a frequency which is at least higher that the line voltage, and at a testing voltage that is lower than a dangerous voltage.

PCT Application No. WO 89/11747 describes a safety device which is switched on between a power supply and a load to be protected. In this device, testing voltages of 5 volts and 9 volts are used for an impedance measurement in order to protect living creatures.

SUMMARY OF THE INVENTION

The present invention is directed to an off-circuit socket-outlet which is independent from external supplied switching commands.

In accordance with the present invention, a voltage supplied measuring device includes a D.C. testing circuit, which is designed to permanently drive a current across a connectible load, the D.C. testing circuit being designed to measure the impedance of a connected load using a test voltage that is low with respect to a possible, dangerous voltage. An alternating current of the measuring device is also provided, the alternating current being at a high frequency, or higher in comparison to the line voltage, and at a low voltage with respect to a possible dangerous voltage. An evaluation circuit, including microprocessors or a CPU, is designed to decide, based on preselected criteria and measuring values supplied by the measuring device, whether the switching contact of the switching device should be connected. A socket-outlet of this type offers should be connected. The evaluation circuit is designed so as not to provide a connection in response to an Impedance 1 of more than 500 Ohms, measured by the D.C. testing circuit, logically ANDed to the relation:

1.3≦Impedance 1/Impedance 2≦15

Impedance 2 being determined by the A.C. testing circuit. The prohibited range, in which a connection is not permitted, corresponds to the criteria defined for a human being. The criteria can be adjusted for other living beings. A socket outlet of this type offers current circuit breaker cannot respond because the entire current is flowing back and forth between the monitored conductors. A situation of this type could arise, for example, when a child, insulated from ground, makes contact with the socket-outlet, in the outer conductor and the return conductor, by inserting nails. Heretofore, it has been attempted to avoid endangerments of this type using shutters with mechanical means keeping the socket-outlet closed as long as contact means are not introduced simultaneously into the connecting openings, such as occurs with a plug and its plug contact pins. However, the socket-outlet proposed here is safer than a shutter of that type, which in unfavorable circumstances, in response to certain actions, can be outsmarted. For entry purposes, suitable criteria is described in literature, for example, the book by Gottfried Bieglmeier, *Wirkungen des elektrischen Stromes auf Menschen und Nutztiere* (The Effects of Electrical Current on Humans and Working Animals).

In practice, it is advantageous if the D.C. testing circuit of the measuring device operates using a voltage in the order of magnitude of 5 volts. For the A.C. testing circuit of the measuring circuit, it is beneficial to select a frequency in the order of magnitude of 10 kHz and a measuring voltage of 5 volts, to ascertain the impedance after a predetermined time period.

It is advantageous to design the evaluation circuit so as not to connect through in response to an Impedance 1 of more than 500 Ohms, measured by the D.C. testing circuit, in logical AND-connection to the relation, 1.3≦Impedance 1/Impedance 2≦15, Impedance 2 being determined by the A.C. testing circuit. The prohibited range, in which through-connecting is not permitted, corresponds to the criteria defined for a human being. The criteria can be adjusted to other living beings.

BRIEF DESCRIPTION OF THE DRAWING

The FIGURE illustrates a socket-outlet safety device in accordance with an exemplary embodiment of the present invention.

DETAILED DESCRIPTION OF THE INVENTION

In the FIGURE, a socket-outlet 1 is illustrated, to which a load 2 is connected. On the supply side, provision can be made for conventional screw connections or also for screwless connections, and on load side 4, plug-in socket-outlets 4 for plug pins. In this context, socket-outlet means all other kinds of plug connections that ensure an analogous safety for the elements to be connected.

A measuring device 5 is supplied with voltage by a power supply unit 6. Measuring device 5 has a D.C. testing circuit 7 and an A.C. testing circuit 8. D.C. testing circuit 7 and A.C. testing circuit 8 cooperate with an evaluation circuit 9. Evaluation circuit 9 can be implemented on the basis of a microprocessor or, generally, as a data processing device having a CPU. When evaluation circuit 9, on the basis of the measuring values of D.C. testing circuit 7 and A.C. testing circuit 8 in comparison to the preselected criteria, observes the safety requirements as being fulfilled, an actuator 10 is acted upon, which conductively controls, i.e., through-connects, a switching device 11. Socket-outlet 1 on supply side 3 has connections for an external conductor L, and for a neural conductor N, and for a protective conductor PE. In the drawing, at load side 4, a load 2 is connected, whose equivalent circuit diagram is depicted by a resistor 12. Power supply unit 6 delivers the on-board line voltage for actuator 10, for evaluation circuit 9, D.C. testing circuit 7, and A.C. testing circuit 8.

D.C. testing circuit 7 permanently seeks to drive a current across a load 2 or its equivalent resistance 12. In response to a connected load, a D.C. current can flow and be measured.

Before the switching contacts of switching device 11 are closed, it is ascertained by measuring device 5 whether an electrical load has the corresponding criteria. For example, if the impedance of resistor 12 is measured by D.C. testing circuit 7 in response to a measuring voltage of 5 volts and if, for example, a measuring value of about 100 ms is evaluated and, subsequently, impedance two of resistor 12 is measured by A.C. testing circuit 8 at 10 KHz at a measuring voltage of 5 volts and is evaluated at about 100 ms, then no connect-through will occur, if the following conditions are met:

Impedance one, measured by D.C. testing circuit 7, is greater than 500 Ohms, i.e., impedance 1>500 Ω; in a logical AND-connection to 1.3≦Impedance 1/Impedance 2≦15. The range where both conditions are satisfied defines the prohibited range, which corresponds to the criteria as they are given for humans. Outside the prohibited range, the through-connection takes place. The criteria can be selected in such a way that various body sizes, for example, of children and adults, can be taken into account, that dry and wet skin, depending on the area of application, can be taken into account. Corresponding minimal and maximal values for the impedance can be entered. The measuring points using D.C. voltage and A.C. voltage can be selected by the D.C. testing circuit and the A.C. testing circuit in such a way that the current-compatibility of an organism to be protected is taken into account in the case of D.C. current and at 10 KHz. To protect persons, testing currents should be employed well within the release limit.

We claim:

1. A safety system for a socket-outlet, the socket-outlet having a supply side and a load side, the supply side coupled to a first voltage source, the load side connectable to a load, comprising:
    a switching device for coupling the supply side to the load side; and
    a measuring device coupled to the load side and including a D.C. test circuit, the D.C. test circuit for driving a current across the load and for measuring a first impedance of the load using a low test voltage, the measuring device further including an A.C. test circuit for measuring a second impedance of the load using a frequency that is high compared to a line voltage, the measuring device further for controlling the switching device to not couple the supply side to the load if i) the first impedance is greater than 500 ohms, and ii) a relation:
    1.3≦first impedance/second impedance≦15 is satisfied.
2. The safety system according to claim 1, wherein the low test voltage is in an order of 5 volts.
3. The safety system according to claim 1, wherein the frequency has a magnitude in an order of 10 kHz, the A.C. test circuit has a measuring voltage in an order of 5 volts, the A.C. test circuit for determining the second impedance within a predetermined time period.

* * * * *